United States Patent Office 3,763,126
Patented Oct. 2, 1973

3,763,126
RANDOM COPOLYMERIZATION OF CONJUGATED DIENES WITH MONOVINYL AROMATIC MONOMERS
Ralph C. Farrar, Bartlesville, Okla., assignor to Phillips Petroleum Company
No Drawing. Filed Sept. 7, 1971, Ser. No. 178,401
Int. Cl. C08f 1/28, 19/08
U.S. Cl. 260—83.7      15 Claims

ABSTRACT OF THE DISCLOSURE

Multilithium polymerization initiators useful in systems containing organoalkali metal alkoxide randomizing agents are prepared with very low ratios of unsaturated reactant:lithium in order to avoid gel formation when subsequently prepared polymers are coupled or terminated with a branching agent.

FIELD OF THE INVENTION

This invention relates to an improved polymerization process employing multilithium polymerization initiators. In another aspect, this invention relates to improved multilithium polymerization initiators for polymerization systems employing organoalkali metal alkoxide randomizing agents. In a further aspect, the invention relates to low vinyl content copolymers.

Organolithium compounds can be used as initiators for the polymerization of conjugated dienes, either alone or with copolymerizable monomers such as the vinyl-substituted aromatic hydrocarbons. It is often desirable for some end uses to produce random copolymers of a conjugated diene and a copolymerizable monomer.

One method for the production of random copolymers involves the incorporation of a polar compound, typically such as an ether, in the hydrocarbon diluent used in the copolymerization process. Such randomizing agents, however, also tend to increase the vinyl content in the polymer unsaturation derived from the conjugated diene monomer.

For many purposes in the polymer field, such as in the fabrication of tires and the like, it is preferred to produce low vinyl materials, i.e., random copolymers having a low vinyl unsaturation content. These desirable low vinyl copolymers can be achieved by the use of an organoalkali metal alkoxide, such as a potassium alkoxide, as a randomizing agent rather than an ether.

However, attempts to prepare low vinyl random copolymers with organoalkali metal randomizing agents when using multifunctional organolithium initiators have met with failure. Such approaches have resulted in undesirable cement viscosities, i.e., high viscosities in the copolymer-hydrocarbon solvent solutions which seriously interfere in efforts to employ polymer coupling agents at the end of the polymerization stage.

High cement viscosities can be reduced by the addition of a small amount of an ether to the polymerization reaction process; however, as would be expected, the ether in turn undesirably increased the vinyl content of the random copolymer. Furthermore, all heretofore known to the art ratios of unsaturated reactant:lithium employed in making multifunctional lithium initiators have resulted in gel on coupling of the polymer in the termination of the polymerization reaction.

OBJECTS OF THE INVENTION

An object of my invention is to provide improved multilithium initiators for polymerization systems employing organoalkali metal alkoxide compounds as randomizing agents. It also is an object of the invention to provide substantially gel-free low vinyl coupled copolymers.

Other aspects, objects, and the several advantages of this invention will be apparent to one skilled in the art from the following description and including the appended claims.

SUMMARY OF THE INVENTION

In a polymerization system for producing random copolymers of a polymerizable conjugated diene and a monomer copolymerizable therewith, employing multifunctional lithium initiator, and using an organoalkali metal alkoxide randomizing agent, the improvement I have discovered is that low vinyl random copolymers can be obtained by use of multifunctional lithium initiators prepared with very low ratios of unsaturated reactant: lithium. Furthermore, I have found that these particular multifunctional lithium initiators also produce copolymers which can be coupled, substantially without the formation of gel. Thus, my multifunctional lithium initiators and polymerization process produce substantially gel-free coupled random copolymers of low vinyl content.

DETAILED DESCRIPTION OF THE INVENTION

Preparation of multifunctional lithium initiators

In preparing the multifunctional lithium initiators, an organomonolithium compound is contacted with an unsaturated reactant which can be a polyvinyl or polyisopropenyl aromatic compound, a polyvinylsilane, or a polyvinylphosphine. Optionally, a solubilizing monomer additionally can be employed. A ratio of unsaturated reactant:organomonolithium compound of less than about 0.1:1 should be employed, preferably less than about 0.08:1, with a range broadly of 0.01:1 to 0.1:1, preferably 0.03:1 to 0.1:1. The amount of the optional solubilizing monomer used will vary depending upon the unsaturated reactant and the organomonolithium compound employed, the mole ratio of the latter materials one to the other, and the temperature and time of the formation reaction. Soluble initiators can be prepared with quite small amounts of solubilizing monomer, such as less than 2 gram millimoles of solubilizing monomer per gram millimole of organomonolithium compound. Of course, larger quantities can be employed where necessary to effect solubilization in other instances.

A mixture of unsaturated reactants can be employed with an organomonolithium compound, or two or more organomonolithium compounds can be used in combination with one or more unsaturated reactants, and again optionally, with one or more solubilizing monomers.

Various procedures can be utilized for preparing the multifunctional lithium polymerization initiators from an unsaturated reactant and the organomonolithium compound, together with the optional solubilizing monomer. The several materials, preferably including a hydrocarbon diluent, all can be charged initially and allowed to react for a determined interval. Or, the organomonolithium compound and the solubilizing monomer can be reacted first, and the unsaturated reactant then introduced and allowed to react. Or, the organomonolithium compound and the unsaturated reactant can be reacted initially, thereafter with the solubilizing monomer.

The hydrocarbon diluent should be inert or nonreactive under the reaction conditions employed. Such diluent can be an aliphatic including cycloaliphatic, or an aromatic, hydrocarbon. Selection generally is made from among those containing from 4 to 20 carbon atoms per molecule, such as n-butane, n-hexane, n-eicosane, 2-octene, 3-hexene, 2,2,4-trimethylpentane, cyclohexane, cyclodecane, cyclooctene, benzene, toluene, the xylenes, and the like, as well as mixtures thereof.

Contacting of the unsaturated reactant with the organomonolithium compound can be at any convenient temperature and under any desired time, under reaction conditions known to produce multilithium initiators. Conditions can range widely. Exemplary conditions include reaction times of from 5 seconds to 48 hours, and contacting temperatures of from −50° C. to +125° C., though lower or higher temperatures can be used where desired, depending upon the diluent, and depending upon the pressure employed which usually is that sufficient to maintain reactants substantially in the liquid phase.

Organomonolithium compounds

Organomonolithium compounds useful in preparing the the multifunctional lithium initiators of my invention can be represented by the formula RLi. R indicates a hydrocarbyl radical, which can be aliphatic including cycloaliphatic, aromatic, or combination thereof such as alkaryl, aralkyl, and the like. The R group need not be particularly limited as to size, though usually contains from 2 to 20 carbon atoms. Exemplary organomonolithium compounds include ethyllithium, n-propyllithium, isopropyllithium, n-butyllithium, sec-butyllithium, tert-octyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-heptylcyclohexyllithium, 4-cyclopentylbutyllithium, and the like. The presently preferred compounds are those in which the alkyl group contains 3 to 10 carbon atoms, particularly at the present time n-butyllithium and sec-butyllithium.

Unsaturated reactants

Of the unsaturated reactants useful in the process of my invention and in preparation of the multifunctional lithium initiators according to my invention, the polyvinyl or polyisopropenyl aromatic compounds can be one or more of compounds represented by the general formulas:

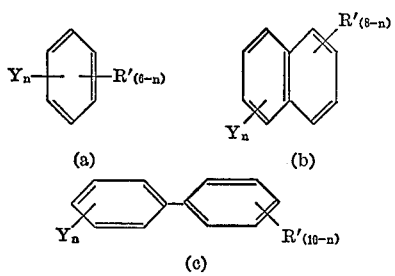

wherein each Y is a vinyl or isopropenyl group, each R' is hydrogen or a lower alkyl of from 1 to 4 carbon atoms and the total of the alkyl substituents contains not more than about 12 carbon atoms, and $n$ is an integer and is 2 or 3. The substituents in the above Formulas (b) and (c) can be on either or both rings. Examples of suitable polyvinyl or polyisopropenyl aromatic compounds include divinylbenzene,
1,2,4-trivinylbenzene,
1,3-divinylnaphthalene,
1,8-divinylnaphthalene,
1,3,5-trivinylnaphthalene,
2,4-divinylbinphenyl,
3,5,4'-trivinylbiphenyl,
1,2-divinyl-3,4-dimethylbenzene,
1,5,6-trivinyl-3,7-diethylnaphthalene,
1,3-divinyl-4,5,8-tributylnaphthalene,
2,2'-divinyl-4-ethyl-4'-propylbiphenyl,
diisopropenylbenzene;
3,4,5,6-tetramethyl-1,2-diisopropenylbenzene;
2,4,5,6-tetraethyl-1,3-diisopropenylbenzene;
2,3,5,6-tetra-n-hexyl-1,4-diisopropenylbenzene;
3,4-dicyclohexyl-1,2-diisopropenylbenzene;
5-(3-methyl-cyclopentyl)-1,3-diisopropenylbenzene;
3-cyclopentylmethyl-6-n-propyl-1,4-diisopropenylbenzene;
4-(2-cyclobutyl-1-ethyl)-1,2-diisopropenylbenzene;
3-(2-n-propylcyclopropyl)-1,4-diisopropenylbenzene;
2-methyl-5-n-hexyl-1,3-diisopropenylbenzene;
4-methyl-1,2-diisopropenylbenzene;
5-ethyl-1,3-diisopropenylbenzene;
3-methyl-1,4-diisopropenylbenzene; and the like.

The divinyl aromatic hydrocarbons containing up to 26 carbon atoms are presently preferred, particularly divinylbenzene in either its ortho, meta or para isomer. Commercial divinylbenzene which is a mixture of isomers is satisfactory.

Polyvinylsilane compounds employed according to this invention can be represented by the formula R″$_4$Si, in which each R″ is hydrocarbon and is a vinyl, saturated aliphatic including saturated cycloaliphatic, or aromatic, radical, or combination thereof, with at least two of the R″ radicals being vinyl, and each of the remaining R″ radicals containing from 1 to 12 carbon atoms. Exemplary of the polyvinylsilane compounds include tetravinylsilane,
methyltrivinylsilane,
diethyldivinylsilane,
n-hexyltrivinylsilane,
di-n-dodecyldivinylsilane,
cyclohexyltrivinylsilane,
diphenyldivinylsilane,
phenyltrivinylsilane,
methylphenyldivinylsilane,
benzyltrivinylsilane,
cyclohexylphenyldivinylsilane,
dodecylcyclopentyldivinylsilane,
2-butyltrivinylsilane,
(3-ethylcyclohexyl)-(3-n-butylphenyl)divinylsilane,
(4-cyclohexylphenyl)trivinylsilane,
(4-cyclohexyl-1-butyl)(3-phenyl-1-hexyl)divinylsilane,
(3,5,6-triethylcyclohexyl)trivinylsilane,
(2-methyl-3-phenylcyclopentyl)trivinylsilane,
dimethyldivinylsilane,
dicyclohexyldivinylsilane, and the like.

Polyvinylphosphine compounds employed according to this invention can be represented by the formula R″$_3$P in which R″ is as defined above. Exemplary polyvinylphosphine compounds include trivinylphosphine,
methyl divinylphosphine,
dodecyl divinylphosphine,
phenyl divinylphosphine,
cyclooctyl divinylphosphine,
(5-phenyl-1-hexyl)divinylphosphine,
(4-methylcyclohexyl)divinylphosphine,
(3-cyclopentylphenyl)divinylphosphine,
(2-ethylphenyl)divinylphosphine,
(3-methylcyclohexyl)divinylphosphine,
(3-cyclohexyl-2-butyl)divinylphosphine,
(3,5-di-n-propylphenyl)divinylphosphine,
3-octyl divinylphosphine, and the like.

Solubilizing monomers

The optional solubilizing monomer can be either a polymerizable conjugated diene or a polymerizable monovinyl-substituted aromatic compound, or mixture thereof. These polymerizable compounds exert a solubilizing action on the reaction product of the unsaturated reactant and organomonolithium compound. The polymerizable conjugated diene generally contains from 4 to 12 carbon atoms per molecule, and the polymerizable monovinyl-substituted aromatic compound from 8 to 20 carbon atoms per molecule. These solubilizing monomers can be any of those described as polymerizable monomers hereinafter.

Polymerization process

Polymers prepared according to my invention broadly are copolymers of at least one polymerizable conjugated diene with at least one comonomer polymerizable therewith, particularly a monovinylidene group containing monomer. Polymerizable conjugated dienes can be any of the polymerizable conjugated dienes. Presently preferred for commercial availability are those containing from 4 to 12 carbon atoms per molecule. Monovinylidene group containing monomers can be any that are copolymerizable with a conjugated diene. Presently preferred are those containing from 8 to 20 carbon atoms per molecule, including styrene and the alkylstyrenes such as 3-methylstyrene, 4-n-propylstyrene, 2,4,6-trimethylstyrene; other monovinyl-substituted aromatic hydrocarbon monomers include 1-vinylnaphthalene, 2-vinylnaphthalene, 4-methyl-1-vinylnaphthalene, 3-ethyl-2-vinylnaphthalene, 4,5-dimethyl-1-vinylnaphthalene, and the like.

In preparing the copolymers it presently is preferred to have a major amount of the conjugated diene and a minor amount of the monovinyl-substituted aromatic compound in the polymerization system. The reaction conditions for producing the desired copolymers are those known to the art, and form no particular part of my invention, since a wide range of temperature, time, and pressure conditions, as well as diluent, can be employed, all as well known to the art. Therefore, conditions described should be considered exemplary.

Polymerizations can be conducted in the presence of a suitable diluent or mixture of diluents, selected from hydrocarbons of the paraffinic including cycloparaffinic, or aromatic type, such as those having from about 4 to 10 carbon atoms per molecule, including benzene, toluene, xylene, cyclohexane, n-hexane, isooctane, and the like. Exemplary polymerization temperatures employed include a broad temperature range of from about $-100°$ F. to $300°$ F. Any convenient pressure, such as substantially that pressure necessary to maintain reactants in a substantially liquid condition, can be employed.

The multifunctional lithium initiators usually are added to a polymerization system in the form of a 0.02 N to 0.4 N dispersion or solution in a suitable diluent. The multifunctional lithium initiators of my invention can be employed at any broad concentration range known to the art for polymerizing polymerizable monomers as I have described. The initiators can be added to the polymerization system initially, or incrementally during the course of the polymerization, or continuously during the course of the polymerization. There appears to be no criticality involved in the amount of the multifunctional initiator employed, since my basic invention lies in the finding that the very low ratio of unsaturated reactant:organomonolithium compound in preparing the initiator is necessary in order to produce a random copolymer using an alkali metal alkoxide as randomizing agent which can be coupled to produce a coupled or branched polymer of low vinyl content without production of gel.

The polymerization process employs a randomizing agent in order to produce the random copolymer desired. The randomizing agent can be an alkali metal salt of a mono- or polyhydric alcohol, or of a mono- or polycarboxylic acid. Such randomizers are disclosed in U.S. Letters Patent 3,294,768 to C. F. Wofford issued Dec. 27, 1966, the description of which, relative to the mono- or polyhydric alcohols and to the mono- or polycarboxylic acids is hereby specifically incorporated. Presently preferred are the alkali metal salts of the alcohols, and of these the potassium salts presently are preferred, particularly such as the potassium salt of tert-amyl alcohol.

In general, the alkali metal salts of mono- or polyhydric alcohols can be represented by the general formula $R^{III}(ZM)_m$. In the formula $R^{III}$ can be aliphatic including cycloaliphatic, or an aromatic, radical, or combination thereof such as alkaryl or aralkyl, containing any number of carbon atoms useful or convenient. Usually the R″ radical contains from 1 to about 20 carbon atoms per molecule. M is an alkali metal and can be sodium, potassium, rubidium, or cesium. Z is oxygen or sulfur. The integer $m$ ranges from 1 to 3.

Specific examples of compounds represented by the above general formula include the sodium, potassium, rubidium, or cesium salts of methyl alcohol, ethyl alcohol, tert-butyl alcohol, tert-amyl alcohol, eicosyl alcohol, allyl alcohol, 1,5,9-trihydroxytridecane, 1,6-dihydroxyoctane, benzyl alcohol, phenol, catechol, 2-naphthol, ethanethiol, 1-butanethiol, benzenethiol (thiophenol), 1,12-dodecanedithiol, 1,10-decanedithiol, 1,4-benzenedithiol, and the like, including mixtures.

The amount of randomizing agent employed can be expressed in a ratio of equivalents of lithium contained in the multifunctional lithium initiator employed to equivalents of alkali metal contained in the alkoxide randomizing agent, and can range from 0.5:1 to 50:1, more narrowly from 3:1 to 30:1. As the ratio is lowered, the ratio of unsaturated reactant:organomonolithium compound in preparation of the multilithium initiators of my invention preferably is decreased in order to prepare the desired low vinyl yet gel-free coupled polymers.

Polymer coupling

Upon completion of the desired degree of polymerization of the polymerizable monomers, the random copolymers so prepared are coupled or terminated with a treating agent having two or more reactive sites, i.e., sites capable of reacting with the polymer-lithium moieties. These reagents couple at least two polymer molecules to each reagent molecule, thus resulting in a coupled linear polymer, or, where the reagent has more than two reactive sites, resulting in a branched coupled polymer. Extent of coupling depends upon the type of reagent, and also on the amount employed.

The polyfunctional treating agents employed include those well known in the polymer arts. Exemplary are the polyepoxides, polyisocyanates, polyimines, polyaldehydes, polyketones, polyanhydrides, polyesters, polyhalides, and the like. Mixtures of two or more materials of a single type can be employed, or from two or more types, or compounds containing two or more types of functional groups can be employed. Polyfunctional treating agents are well known in the art, and are described with particularity in such patents as U.S. Letters Patent 3,281,383, Oct. 25, 1966, to Zelinski and Hsieh.

Among the presently preferred polyfunctional treating agents are those termed the polyhalides, particularly the silicon polyhalides such as silicon tetrachloride, tribromosilane, or any of the equivalent iodo- or fluoro-substituted silicon compounds.

The polyfunctional treating agents most commonly are added to the unquenched polymerization reaction mixture at the conclusion of the polymerization, prior to the addition of any material, such as water, acid, or alcohol, which would tend to inactivate and/or remove the active lithium atoms present in the polymer.

The coupling or branching reaction can be conducted over a broad temperature range as is known to the art, and under broad conditions of time and pressure. Ordinarily, temperatures employed are from room temperature up to about 250° F., though up to about 100° F. provides sufficiently rapid reaction. The amount of polyfunctional treating agent used can range broadly, such as from 0.1 to 1.5 equivalents of treating agent based upon the lithium contained in the multi-functional lithium initiator in the polymerization process, with one equivalent of treating agent considered optimum.

and polymer end use purposes. Only multifunctional initiators MFI prepared by my discovery with the very low ratio of unsaturated reactant:organomonolithium compound could be used without causing substantial gel formation on coupling. A ratio of lithium-potassium of 13:1 was employed in all runs. Monomer conversion was essentially 100 percent in all runs. No THF was employed in the runs of this example.

TABLE I
[Coupling low-vinyl random copolymer prepared with multifunctional initiator]

| Run | Coupling time, min. | SiCl$_4$, mmoles [a] | Inherent viscosity [b] | Mooney ML-4 [c] | Cement viscosity, cp. | | |
|---|---|---|---|---|---|---|---|
| | | | | | Before coupling | Coupled | Terminated |
| 0.10:1 DVB:Li MFI [d] (1.50 meq.[a] MFI and 0.0845 mmole [a] Kobu) | | | | | | | |
| 1 | 60 | 0 | 1.12 | 10 | 1,030 | | 70 |
| 2 | 60 | 0.275 | 2.81 | 129 | | 2,200 | 1,100 |
| 3 | 90 | 0 | 1.14 | 9.5 | 920 | | 70 |
| 4 | 90 | 0.275 | 2.66 | 117 | | 1,760 | 1,170 |
| 5 | 120 | 0 | 1.15 | 9 | 900 | | 50 |
| 6 | 120 | 0.275 | 2.43 | 90 | | 1,100 | 530 |
| 0.15:1 DVB:Li MFI (1.80 meq. MFI and 0.1077 mmole Kobu) | | | | | | | |
| 7 | 60 | 0 | | 5 | 970 | | 70 |
| 8 | 60 | 0.35 | | [e] ≥145 | | Gel | Gel |
| 9 | 90 | 0 | | 5.5 | 920 | | 50 |
| 10 | 90 | 0.35 | | ≥128 | | Gel | 1,100 |

[a] Amounts expressed in terms of quantity (mmole or meq.) per 100 g. of monomers.
[b] Inherent viscosity determined according to the procedure of U.S. 3,278,508, col. 20, notes a and b.
[c] ASTM Method D-1646-63, Mooney viscosity, ML-4, at 212° F.
[d] MFI=Multifunctional initiator.
[e] The symbol "≥" wherever used in this or following tables indicates that the Mooney value is at least the indicated value, with the possibility that the sample slipped during the determination.

After the degree of coupling desired is obtained, the coupling process can be terminated and the polymer recovered by methods known to the art, including treatment with materials containing active hydrogen, such as alcohol, acid, aqueous solutions thereof, and similar reagents.

EXAMPLES

The following examples should be considered illustrative, with the particular reactants, reagents, monomers, other compounds, viewed purely as illustrative and thus not as limitative of the reasonable extent and scope of my invention.

Example I

The following polymerization recipe was employed in runs illustrating my invention including control runs.

| Polymerization recipe | Parts (meq.) |
|---|---|
| Butadiene | 75. |
| Styrene | 25. |
| Cyclohexane | 760. |
| Potassium tert-butoxide (KoBu) | 0 or variable. |
| Multifunctional initiator (MFI) | Do. |
| Silicon tetrachloride (SiCl$_4$) | Do. |
| Temperature, ° F. | 158 (70° C.). |
| Time, minutes | Variable. |

All runs employed n-butyllithium in preparing the multifunctional initiators MFI. Polymers produced according to the above recipe were terminated with a polyfunctional treating agent, silicon tetrachloride, in order to produce coupled polymers with reduced cold flow and to introduce the branching desired for good processing These data in runs 1 through 6 inclusive show clearly that only quite low ratios of DVB:Li, i.e., low ratios of unsaturated reactant:lithium could be used in preparing multifunctional lithium initiators without resulting in gel on coupling of the polymer, while higher ratios of DVB:Li in runs 7 through 10 resulted in gel.

Example I

Within the context of my invention, it is possible to use prior art randomizing agents, such as ethers, in small amount in the alkali metal alkoxide randomizing polymerization system in order to decrease the cement, i.e., polymer in polymerization solvent, viscosity at the end of polymerization reaction, thus facilitating coupling. High cement viscosities interfere with adequate admixing of the coupling agent into the polymerization mixture and hence interfere with proper utilization of the coupling or branching agent. Of course, as has been discussed, such additives also tend to increase the vinyl unsaturation of the random copolymer. At the same time, the use of ethers, such as tetrahydrofuran, does not avoid the formation of gel in the coupled polymer, unless a very low ratio initiator is utilized in the polymerization, i.e., a multifunctional initiator prepared with a very low ratio of unsaturated reactant:organomonolithium compound.

The data following in Table II reflect the ratio of unsaturated reactant:organomoonlithium compound in preparing multifunctional lithium initiators useful in preparing coupled polymers without gel. All runs employed 0.162 part 2.25 mmoles tetrahydrofuran per 100 g. of monomers in a random copolymerization process otherwise utilizing the polymerization recipe described in Example I. Monomer conversion was high, 98 to 100 percent, in all cases. A coupling time of 60 minutes was used in all runs.

TABLE II
[Effect of DVB:Li ratio with random copolymers]

| Run No. | MFI, meq. | KOBu, mmole | SiCl₄, mmole | Conv., percent | Inherent viscosity | Mooney, ML-4 Unextended | Mooney, ML-4 Extended [a] |
|---|---|---|---|---|---|---|---|
| 0:1 DVB:Li MFI (active Li:K=8.8:1) ||||||||
| 19 | [b] 1.02 | 0.0705 | 0 | 98 | 1.46 | 30 | |
| 20 | [b] 1.02 | 0.0705 | 0.155 | 98 | 3.06 | Slipped | 56.5 |
| 0.025:1 DVB:Li MFI (active Li:K=8.8:1) ||||||||
| 21 | 1.02 | 0.0705 | 0 | 99 | 1.51 | 30.5 | |
| 22 | 1.02 | 0.0705 | 0.155 | 99 | 3.38 | Slipped | 67.5 |
| 0.050:1 DVB:Li MFI (active Li:K=8.8:1) ||||||||
| 23 | 1.02 | 0.0705 | 0 | 99 | 1.46 | 28 | |
| 24 | 1.02 | 0.0705 | 0.155 | 99 | 3.93 | Slipped | 72 |
| 0.070:1 DVB:Li MFI (active Li:K=8.7:1) ||||||||
| 25 | 1.00 | 0.0705 | 0 | 99 | 1.59 | 41.5 | |
| 26 | 1.00 | 0.0705 | 0.155 | 99 | 3.44 | ≥160 | 64.5 |
| 0.080:1 DVB:Li MFI (active Li:K=8.7:1) ||||||||
| 27 | 1.00 | 0.0705 | 0 | 98 | 1.56 | 38 | |
| 28 | 1.00. | 0.0705. | 0.155. | 99. | [c] 3.52 | Slipped | 75.5 |
| 0.090:1 DVB:Li MFI (active Li:K=8.5:1) ||||||||
| 29 | 1.05 | 0.0761 | 0 | 98 | 1.56 | 39.5 | |
| 30 | 1.05 | 0.0761 | 0.167 | 98 | [d] 3.03 | 150 | 64.5 |
| 0.10:1 DVB:Li MFI (active Li:K=9.2:1) ||||||||
| 31 | 1.20 | 0.0932 | 0 | 100 | | 17 | |
| 32 | 1.20 | 0.0932 | 0.205 | 100 | (e) | ≥125 | 50.5 |
| 33 | 1.05 | 0.0761 | 0 | 100 | | 32 | |
| 34 | 1.05 | 0.0761 | 0.167 | 100 | (e) | ≥158 | 62 |
| 0.15:1 DVB:Li MFI (active Li:K=8.3:1) ||||||||
| 35 | 1.27 | 0.1112 | 0 | 98 | | 9 | |
| 36 | 1.27 | 0.1112 | 0.222 | 97 | (e) | ≥152 | 61.5 |
| 37 | 1.13 | 0.0937 | 0 | 98 | | 14 | |
| 38 | 1.13 | 0.0937 | 0.187 | 96 | (e) | ≥165 | 67.5 |
| 0.20:1 DVB:Li MFI (active Li:K=7.0:1) ||||||||
| 39 | 1.30 | 0.1313 | 0 | 97 | | 17.5 | |
| 40 | 1.30 | 0.1313 | 0.230 | 96 | (e) | ≥144 | 58 |
| 41 | 1.14 | 0.1083 | 0 | 99 | | 27 | |
| 42 | 1.14 | 0.1083 | 0.190 | 96 | (e) | ≥144 | 55 |

[a] Polymer product extended with 37.5 parts by weight of a conventional extender oil per 100 parts by weight of polymer.
[b] Control runs employing organomonolithium initiator.
[c] 24% gel.
[d] 8% gel.
[e] Contained loose gel.

These data demonstrate that the employment of even minor amounts of an ether results in gel unless very low ratios of DVB:Li are employed in preparing the multifunctional lithium initiators.

Reasonable variations and modifications are possible yet within the scope of our disclosure, and without departing from the scope and spirit thereof.

I claim:

1. In a polymerization process for producing a random copolymer of at least one polymerizable conjugated diene monomer and at least one copolymerizable monovinyl aromatic monomer, employing a multifunctional lithium initiator, and employing an alkali metal alkoxide or carboxylate as randomizing agent, and wherein the polymer so produced is coupled with a treating agent having at least two reactive sites, capable or reacting with polymer-lithium moieties, wherein the improvement comprises producing a coupled low vinyl copolymer substantially without the formation of gel by forming said multifunctional lithium initiator from (I) at least one organomonolithium compound and (II) at least one unsaturated reactant, wherein is employed a molar ratio of unsaturated reactant:organomonolithium compound of less than about 0.1:1, wherein said (I) organomonolithium compound can be represented by RLi wherein R is hydrocarbyl, and said (II) unsaturated reactant is a (IIa) polyvinyl or polyisopropenyl aromatic compound, a (IIb) polyvinyl silane compound, or a (IIc) polyvinylphosphine compound, wherein said (IIa) can be represented by

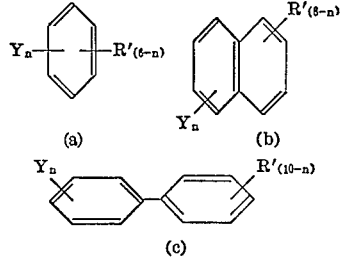

wherein Y is a vinyl or isopropenyl group, each R' is hydrogen or alkyl such that the total of all alkyl substituents is not more than about 12 carbon atoms, and $n$ is 2 or 3;

said (IIb) polyvinylsilane compound can be represented by R″₄Si wherein each R″ is a hydrocarbon radical such that at least two R″ groups are vinyl and each of the remaining R″ radicals contains from 1 to 12 carbon atoms; and said (IIc) polyvinylphosphine can be represented by R″₃P.

2. The polymerization process according to claim 1 wherein said (I) and said (II) are contacted at a temperature of −50° C. to +125° C. in the presence of a hydrocarbon diluent containing 4 to 20 carbon atoms per molecule.

3. The polymerization process according to claim 3 wherein further is employed in the formation of said multifunctional lithium initiator at least one solubilizing monomer, said solubilizing monomer is a polymerizable conjugated diene, a polymerizable monovinyl-substituted aromatic compound, or mixture thereof, and said solubilizing monomer is employed in a minor effective amount sufficient to substantially solubilize the multifunctional lithium initiator.

4. The polymerization process according to claim 2 further employing a minor amount of at least one ether, and wherein the ratio of said unsaturated reactant:said organomonolithium compound is less than about 0.08:1.

5. The polymerization process accordinng to claim 3 wherein said polymerizable conjugated diene contains 4 to 12 carbon atoms per molecule, and said copolymerizable monovinyl aromatic monomer contains 8 to 20 carbon atoms per molecule.

6. The polymerization process according to claim 5 wherein said randomizing agent is said alkali metal alkoxide and is an alkali metal salt of a mono- or polyhydric alcohol represented by the formula $R^{III}(ZM)_m$ wherein said $R^{III}$ is an aliphatic or aromatic group, or combination thereof, and contains up to 20 carbon atoms per molecule; M is an alkali metal and is sodium, potassium, rubidium, or cesium; Z is oxygen or sulfur; and $m$ is an integer of 1 to 3.

7. The polymerization process according to claim 6 wherein said alkali metal alkoxide is employed in an amount sufficient to provide about 0.5:1 to 50:1 ratio of equivalents of lithium in said multifunctional lithium initiator:alkali metal in said randomizing agent.

8. The polymerization process according to claim 7 wherein said polymerization process reaction is conducted in the presence of a hydrocarbon diluent containing 4 to 10 carbon atoms per molecule, at polymerization temperatures of —100° F. to 300° F., and under a pressure sufficient to maintain reactants in substantially liquid phase.

9. The polymerization process according to claim 8 wherein the coupling of said polymer employs said treating agent having at least two reactive sites, and said treating agent is employed in an amount sufficient to provide 0.1 to 1.5 equivalents of treating agent based on lithium employed in said multifunctional lithium initiator.

10. The polymerization process according to claim 9 wherein said polymerizable conjugated diene is butadiene, said copolymerizable monomer is styrene, said alkali metal alkoxide randomizing agent is potassium tert-butoxide, and said multifunctional lithium initiator is prepared from n-butyllithium and divinylbenzene.

11. The polymerization process according to claim 1 employing a ratio of equivalents of lithium in said initiator:equivalents of alkali metal in said randomizing agent of 0.5:1 to 50:1; and wherein said polyfunctional treating agent containing at least two reactive sites is selected from the group consisting of polyepoxides, polyisocyanates, polyimines, polyaldehydes, polyketones, polyanhydrides, polyesters, polyhalides, compounds containing at least two types of functional groups, and mixtures.

12. The polymerization process according to claim 11 wherein said polyfunctional treating agent is a silicon polyhalide.

13. The polymerization process according to claim 1 wherein the molar ratio of equivalents of unsaturated reactant:organomonolithium compound is less than about 0.08:1.

14. The polymerization process according to claim 1 wherein the molar ratio of equivalents of unsaturated reactant:organomonolithium compound is about 0.01:1 to 0.1:1.

15. The polymerization process according to claim 1 wherein the molar ratio of equivalents of unsaturated reactant:organomonolithium compound is about 0.03:1 to 0.1:1.

References Cited
UNITED STATES PATENTS

| | | | |
|---|---|---|---|
| 3,280,084 | 10/1966 | Zelinski et al. | 260—83.7 |
| 3,281,383 | 10/1966 | Zelinski et al. | 260—88.0 |
| 3,294,768 | 12/1966 | Wofford | 260—94.2 T |
| 3,624,057 | 11/1971 | Farrar | 260—83.7 |
| 3,652,516 | 3/1972 | Farrar | 260—94.2 |

JAMES A. SEIDLECK, Primary Examiner

U.S. Cl. X.R.

260—85.1, 94.2 T

UNITED STATES PATENT AND TRADEMARK OFFICE
CERTIFICATE OF CORRECTION

PATENT NO. : 3,763,126
DATED : October 2, 1973
INVENTOR(S) : Ralph C. Farrar

It is certified that error appears in the above-identified patent and that said Letters Patent are hereby corrected as shown below:

Column 9, line 62, delete "or" and insert therefor --- of ---; column 11, line 1, delete "3" after "claim" and insert therefor --- 2 ---; and column 11, line 14, delete "accordinng" and insert therefor --- according ---.

Signed and Sealed this

*ninth* Day of *September 1975*

[SEAL]

*Attest:*

RUTH C. MASON
*Attesting Officer*

C. MARSHALL DANN
*Commissioner of Patents and Trademarks*